(12) United States Patent
Zheng

(10) Patent No.: US 12,391,208 B2
(45) Date of Patent: Aug. 19, 2025

(54) CURTAIN AIRBAG INSTALLING STRUCTURE AND VEHICLE

(71) Applicant: BEIJING CHEHEJIA AUTOMOBILE TECHNOLOGY CO., LTD., Beijing (CN)

(72) Inventor: Liang Zheng, Beijing (CN)

(73) Assignee: BEIJING CHEHEJIA AUTOMOBILE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/840,579

(22) PCT Filed: Feb. 7, 2023

(86) PCT No.: PCT/CN2023/074821
§ 371 (c)(1),
(2) Date: Aug. 22, 2024

(87) PCT Pub. No.: WO2023/160384
PCT Pub. Date: Aug. 31, 2023

(65) Prior Publication Data
US 2025/0162531 A1 May 22, 2025

(30) Foreign Application Priority Data
Feb. 23, 2022 (CN) .......................... 202220373781.9

(51) Int. Cl.
*B60R 21/232* (2011.01)
*B60R 21/213* (2011.01)

(52) U.S. Cl.
CPC .......... *B60R 21/213* (2013.01); *B60R 21/232* (2013.01)

(58) Field of Classification Search
CPC ........................... B60R 21/232; B60R 21/213
(Continued)

(56) References Cited

U.S. PATENT DOCUMENTS

| 6,231,068 | B1 | 5/2001 | White, Jr. et al. |
| 6,565,116 | B1 * | 5/2003 | Tajima .................. F16B 21/075 24/297 |

(Continued)

FOREIGN PATENT DOCUMENTS

| CN | 101312859 | 11/2008 |
| CN | 103079904 | 5/2013 |

(Continued)

OTHER PUBLICATIONS

WIPO, International Search Report and Written Opinion for PCT/CN2023/074821, Jun. 5, 2023.

*Primary Examiner* — Keith J Frisby
(74) *Attorney, Agent, or Firm* — Hodgson Russ LLP

(57) ABSTRACT

A curtain airbag installing structure includes: a connecting bolt provided with an annular limiting groove in a periphery of the connecting bolt; a connector provided with a first insertion hole and a second insertion hole communicated with each other, in which the first insertion hole is configured to allow an end of the connecting bolt to pass through the connector, and the second insertion hole has an opening size smaller than an opening size of the first insertion hole; and an elastic sheet having a first end connected to the connector, and a second end configured to abut against the end of the connecting bolt. An elastic tongue configured to limit a radial displacement of the connecting bolt is arranged in a middle of the elastic sheet, and an included angle between the elastic tongue and the second end of the elastic sheet is an acute angle.

20 Claims, 2 Drawing Sheets

(58) Field of Classification Search
USPC .......................................... 280/728.2, 730.2
See application file for complete search history.

(56) References Cited

U.S. PATENT DOCUMENTS

| | | | | |
|---|---|---|---|---|
| 7,216,891 | B2* | 5/2007 | Biglino | B60R 21/232 |
| | | | | 24/458 |
| 11,173,864 | B2* | 11/2021 | Moran | B60R 21/232 |
| 2003/0025307 | A1* | 2/2003 | Hoeft | B60R 21/20 |
| | | | | 280/730.2 |
| 2006/0237950 | A1* | 10/2006 | Worrell | B60R 21/213 |
| | | | | 280/730.2 |
| 2008/0014045 | A1 | 1/2008 | Kawai | |
| 2008/0238046 | A1* | 10/2008 | Giddings | B60R 21/20 |
| | | | | 280/728.2 |

FOREIGN PATENT DOCUMENTS

| | | |
|---|---|---|
| CN | 111120468 | 5/2020 |
| CN | 213831603 | 7/2021 |
| CN | 217435672 | 9/2022 |

* cited by examiner

CURTAIN AIRBAG INSTALLING STRUCTURE AND VEHICLE

CROSS-REFERENCE TO RELATED APPLICATIONS

This application is a U.S. national phase entry under 35 U.S.C. § 371 of International Application No. PCT/CN2023/074821, filed on Feb. 7, 2023, which claims priority to Chinese Patent Application No. 202220373781.9, filed on Feb. 23, 2022, the entire disclosures of which are incorporated herein by reference.

FIELD

The present disclosure relates to the field of vehicles, and more particularly to a curtain airbag installing structure and a vehicle.

BACKGROUND

With the attention of people to the safety performance of automobiles, more and more new automobiles are equipped with a side curtain airbag. When the automobile has a side collision, the curtain airbag can deploy in time to separate the passenger's head and even the passenger's chest from the interior decoration of the automobile, thus avoiding the harm to the human body caused by a secondary collision.

SUMMARY

On the one hand, embodiments of the present disclosure provide a curtain airbag installing structure, including: a connecting bolt configured to be connected with a vehicle body, the connecting bolt being provided with an annular limiting groove in a periphery of the connecting bolt; a connector configured to be connected with an airbag, in which the connector is provided with a first insertion hole and a second insertion hole, the first insertion hole is configured to allow an end of the connecting bolt to pass through the connector, the first insertion hole is in communication with the second insertion hole, and the second insertion hole has an opening size smaller than an opening size of the first insertion hole, so that an edge of the second insertion hole is inserted and fitted into the annular limiting groove; and an elastic sheet, in which a first end of the elastic sheet is connected to the connector, a second end of the elastic sheet arranged opposite to the first end of the elastic sheet is configured to abut against the end of the connecting bolt, an elastic tongue configured to limit a radial displacement of the connecting bolt is arranged in a middle of the elastic sheet, and an included angle between the elastic tongue and the second end of the elastic sheet is an acute angle.

On the other hand, embodiments of the present disclosure further provide a vehicle, including a vehicle body, an airbag and a curtain airbag installing structure. The curtain airbag installing structure includes: a connecting bolt connected with the vehicle body, the connecting bolt being provided with an annular limiting groove in a periphery of the connecting bolt: a connector connected with the airbag, in which the connector is provided with a first insertion hole and a second insertion hole, the first insertion hole is configured to allow an end of the connecting bolt to pass through the connector, the first insertion hole is in communication with the second insertion hole, and the second insertion hole has an opening size smaller than an opening size of the first insertion hole, so that an edge of the second insertion hole is inserted and fitted into the annular limiting groove; and an elastic sheet, in which a first end of the elastic sheet is connected to the connector, a second end of the elastic sheet arranged opposite to the first end of the elastic sheet is configured to abut against the end of the connecting bolt, an elastic tongue configured to limit a radial displacement of the connecting bolt is arranged in a middle of the elastic sheet, and an included angle between the elastic tongue and the second end of the elastic sheet is an acute angle.

BRIEF DESCRIPTION OF THE DRAWINGS

The drawings herein are incorporated into the specification and form a part of the specification, show embodiments that comply with the present disclosure, and are used to explain the principles of the present disclosure together with the specification.

In order to more clearly explain the technical solution in embodiments of the present disclosure or in the related art, the drawings required to be used in the description of the embodiments or the related art will be briefly described below, and it is obvious that for those skilled in the art, other drawings can be obtained according to these drawings without creative labor.

DETAILED DESCRIPTION

In order to more clearly understand the purposes, features and advantages of the present disclosure, embodiments of the present disclosure will be further described below. It should be noted that the embodiments of the present disclosure and the features in the embodiments can be combined with each other without conflict.

In order to fully understand the present disclosure, many specific details are explained in the following description, but the present disclosure can also be implemented in other ways different from those described here. Obviously, the embodiments in this specification are only a part of the embodiments of the present disclosure, but not all of them.

A curtain airbag is connected with a vehicle body by bolts or buckles. The curtain airbag is as long as 2 to 3 meters, the bolt installation requires the use of a pre-hook, and also, two to three workers are needed to cooperate, so that the installation time is long, and the production efficiency is affected. Moreover, the buckle is shielded by a lug configured to connect the buckle with the curtain airbag. There is uncertainty about whether the buckle is completely buckled into an opening of the vehicle body and whether it is installed in place, thus resulting in a great potential safety hazard.

In order to solve the above technical problems, embodiments of the present disclosure provide a curtain airbag installing structure and a vehicle.

Figure 1:
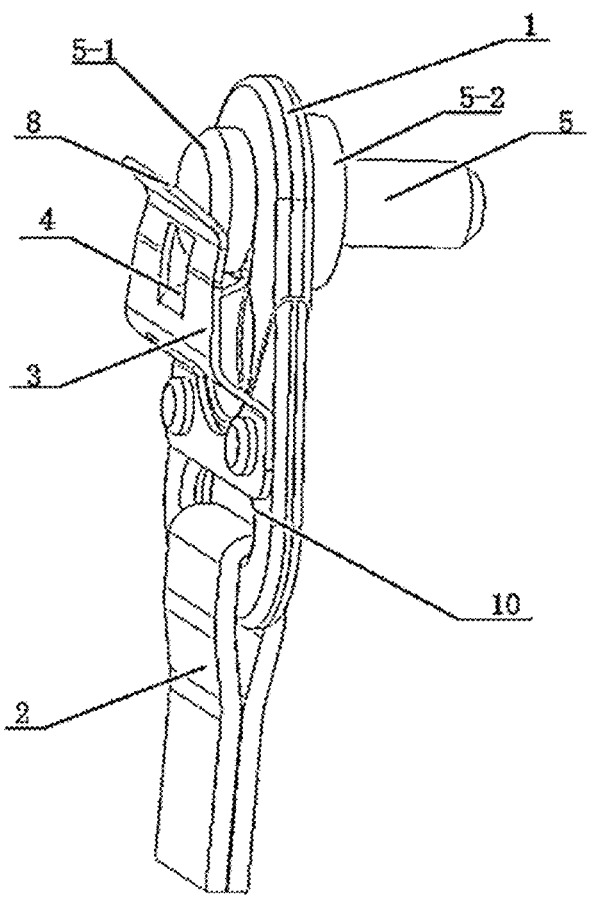
FIG. 1 is a schematic view of a curtain airbag installing structure after installation is completed according to an embodiment of the present disclosure.
Figure 2:
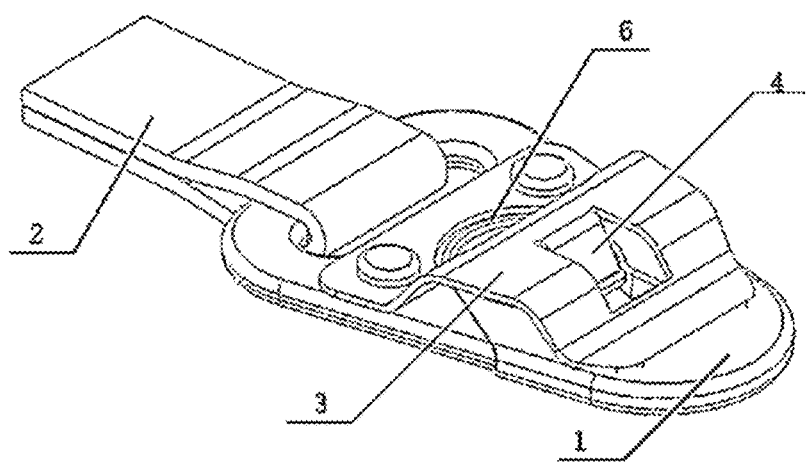
FIG. 2 is a schematic view of a front side of a connector according to an embodiment of the present disclosure.
Figure 3:
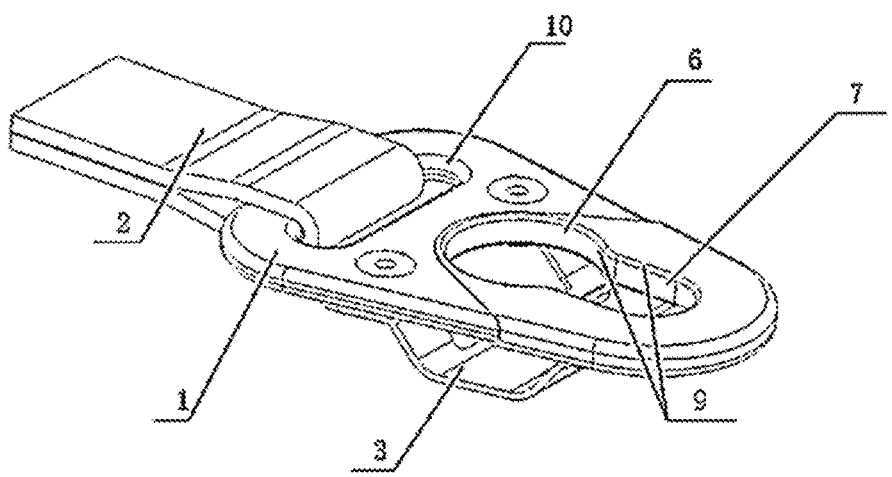
FIG. 3 is a schematic view of a reverse side of a connector according to an embodiment of the present disclosure.
Figure 4:
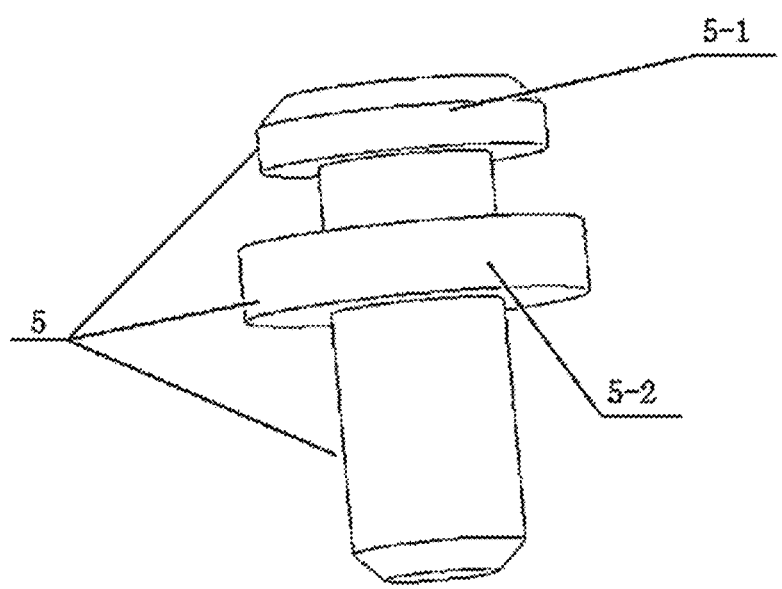
FIG. 4 is a schematic view of a connecting bolt according to an embodiment of the present disclosure.

As shown in FIG. 1, FIG. 2, FIG. 3 and FIG. 4, an embodiment of the present disclosure provides a curtain airbag installing structure, which includes a connecting bolt 5, a connector 1 and an elastic sheet 3.

The connecting bolt 5 is configured to be connected to a vehicle body. The connecting bolt 5 is provided with an annular limiting groove in a periphery of the connecting bolt 5, and the annular limiting groove is located in a middle of the connecting bolt 5 along an axial direction of the connecting bolt 5.

The connector 1 is configured to be connected to a curtain airbag. The connector 1 is provided with a first insertion hole 6 and a second insertion hole 7, the first insertion hole 6 is configured to allow an end of the connecting bolt 5 to pass through the connector 1, the first insertion hole 6 is in communication with the second insertion hole 7, and the second insertion hole 7 has an opening size smaller than an opening size of the first insertion hole 6, so that an edge of the second insertion hole 7 is inserted and fitted into the annular limiting groove, that is, the opening size of the first insertion hole 6 is larger than a size of the end of the connecting bolt 5, and the edge of the second insertion hole 7 is inserted into the annular limiting groove on the connecting bolt 5.

A first end of the elastic sheet 3 is connected to the connector 1, a second end of the elastic sheet 3, which is arranged opposite to the first end of the elastic sheet 3, is configured to abut against the end of the connecting bolt 5. An elastic tongue 4 configured to limit a radial displacement of the connecting bolt 5 is arranged in a middle of the elastic sheet 3, and an included angle between the elastic tongue 4 and the second end of the elastic sheet 3 is an acute angle, that is, the elastic tongue 4 is located between the connector 1 and the middle of the elastic sheet 3, and a head of the elastic tongue 4 is inclined towards a side where the second end of the elastic sheet 3 is located, so as to facilitate the end of the connecting bolt 5 to slide across an inclined surface of the elastic tongue 4 on a side of the elastic tongue 4 towards the connector 1.

In some specific embodiments, during installation, the first insertion hole 6 of the connector 1 needs to be aligned with the end of the connecting bolt 5 and the connector 1 is pressed in direction of the connecting bolt 5, and then the connector 1 is slid towards a side, so as to slide the end of the connecting bolt 5 to the second insertion hole 7. In this process, the end of the connecting bolt 5 slides across the inclined surface of the elastic tongue 4 on the side of the elastic tongue 4, and jacks up both the elastic tongue 4 and the elastic sheet 3 towards a side facing away from the connector 1. When the end of the connecting bolt 5 slides across the elastic tongue 4, the edge of the second insertion hole 7 is completely inserted in the annular limiting groove of the connecting bolt 5. At this time, both the elastic sheet 3 and the elastic tongue 4 spring back to a side where the connector 1 is located, the elastic tongue 4 slides down from the end of the connecting bolt 5 towards the side where the connector 1 is located, and generates a click. At this time, the head of the elastic tongue 4 abuts against a circumferential side surface of the end of the connecting bolt 5 or is inserted into a gap at a insertion position between the connecting bolt 5 and the second insertion hole 7, and the second end of the elastic sheet 3 abuts against an end face of the connecting bolt 5, so as to connect the connector 1 with the connecting bolt 5 and limit a relative displacement between the connector 1 and the connecting bolt 5. That is, the edge of the second insertion hole 7 is inserted and fitted into the annular limiting groove, so as to ensure that the connector 1 is fixed in the axial direction of the connecting bolt 5. The click is generated when the elastic tongue 4 falls back, so as to prompt an installer that the connecting bolt 5 is in place. The elastic tongue 4 falls back and then abuts against a side of the connecting bolt 5, thereby ensuring that the connector 1 is fixed in a radial direction of the connecting bolt 5.

In some embodiments, the connecting bolt 5 includes a bolt cap 5-1 and a limiting part 5-2, and the annular limiting groove is formed between the bolt cap 5-1 and the limiting part 5-2.

In some embodiments, a diameter of the limiting part 5-2 is larger than the opening size of the first insertion hole 6, so that after the bolt cap 5-1 is inserted into the first insertion hole 6, the limiting part 5-2 abuts against a side of the connector 1, so as to facilitate the annular limiting groove of the connecting bolt 5 to be aligned with the second insertion hole 7 during installation.

In some embodiments, a bent part 8 is arranged in the middle of the elastic sheet 3, and a maximum distance between the bent part 8 and the connector 1 is less than a sum of sizes of the bolt cap 5-1 and the annular limiting groove in the axial direction of the connecting bolt 5, so as to ensure that after the connecting bolt 5 is inserted into the first insertion hole 6, and before the limiting part 5-2 abuts against the connector 1, the bent part 8 of the elastic sheet 3 can undergo an elastic deformation in a direction facing away from the connector 1 under a force of the connecting bolt 5.

Moreover, in the process of the end of the connecting bolt 5 sliding in direction of the second insertion hole 7 after being inserted into the first insertion hole 6, the bent part 8 is beneficial for the middle of the elastic sheet 3 to be jacked up by the end of the connecting bolt 5 and fall back, to avoid a situation that the elastic tongue 4 interferes with the end of the connecting bolt 5 (which makes it difficult for installation) due to a too large elasticity of the elastic sheet 3, thus saving manpower.

In some embodiments, in the connector 1, at least a surface in contact with the connecting bolt 5 is provided with a plastic coating layer, so as to prevent an abnormal sound from being generated when the connecting bolt 5 touches the connector 1.

In some embodiments, the plastic coating layer is at least arranged in the annular limiting groove, so as to prevent the abnormal sound from being generated when the connecting bolt 5 touches the connector 1.

In some embodiments, the connector 1 is provided with an opening 10 configured to be connected with a lug 2. When installing the lug 2 and the connector 1, an end of the lug 2 passes through the opening 10 and is wound back, and then the end wound back is sewed and fixed with a middle of the lug 2.

In some embodiments, a guide section 9 is arranged between the first insertion hole 6 and the second insertion hole 7, and the guide section 9 is also configured to transition the connection between the first insertion hole 6 and the second insertion hole 7, that is, two ends of a side wall of the guide section 9 are smoothly connected with side walls defining the first insertion hole 6 and the second insertion hole 7, respectively.

In some embodiments, a distance between two opposite guide sections 9 may be arranged to gradually decrease from the first insertion hole 6 to the second insertion hole 7, so as to facilitate the sliding of the connecting bolt 5 between the first insertion hole 6 and the second insertion hole 7, thereby saving manpower.

In some embodiments, a free end of the elastic tongue 4 is provided with a bent section for abutting against the connecting bolt 5, that is, after the connecting bolt 5 is inserted into the second insertion hole 7, the bent section is inserted into the gap between the connecting bolt 5 and the second insertion hole 7 or abuts against an outer peripheral surface of the connecting bolt 5, thus increasing the stability of the connection between the connecting bolt 5 and the connector 1.

An embodiment of the present disclosure further provides a vehicle, including the curtain airbag installing structure described above.

In the vehicle, an airbag on the vehicle is connected with an end of the connector 1, and an end of the connecting bolt 5 is connected with the vehicle body. During installation, the first insertion hole 6 of the connector 1 needs to be aligned with the end of the connecting bolt 5 and the connector 1 is pressed in direction of the connecting bolt 5, and then the connector 1 is slid towards a side, so as to slide the end of the connecting bolt 5 to the second insertion hole 7. In this process, the end of the connecting bolt 5 slides across the inclined surface of the elastic tongue 4 on the side of the elastic tongue 4, and jacks up both the elastic tongue 4 and the elastic sheet 3 towards a side facing away from the connector 1. When the end of the connecting bolt 5 slides across the elastic tongue 4, the edge of the second insertion hole 7 is completely inserted in the annular limiting groove of the connecting bolt 5. At this time, both the elastic sheet 3 and the elastic tongue 4 spring back to a side where the connector 1 is located, the elastic tongue 4 slides down from the end of the connecting bolt 5 towards the side where the connector 1 is located, and generates a click. At this time, the head of the elastic tongue 4 abuts against a circumferential side surface of the end of the connecting bolt 5 or is inserted into a gap at a insertion position between the connecting bolt 5 and the second insertion hole 7, and the second end of the elastic sheet 3 abuts against an end face of the connecting bolt 5, so as to connect the connector 1 with the connecting bolt 5 and limit a relative displacement between the connector 1 and the connecting bolt 5. That is, the edge of the second insertion hole 7 is inserted and fitted into the annular limiting groove, so as to ensure that the connector 1 is fixed in the axial direction of the connecting bolt 5. The click is generated when the elastic tongue 4 falls back, so as to prompt an installer that the connecting bolt 5 is in place. The elastic tongue 4 falls back and then abuts against a side of the connecting bolt 5, thereby ensuring that the connector 1 is fixed in a radial direction of the connecting bolt 5.

It should be noted that in the present disclosure, relative terms such as "first" and "second" are only used to distinguish one entity or operation from another entity or operation, and do not necessarily require or imply any such actual relationship or order between these entities or operations. Furthermore, the terms "include", "comprise" or any other variations thereof are intended to cover non-exclusive inclusions such that a process, method, article, or device including a series of elements includes not only those elements, but also other elements that are not expressly listed, or also includes elements inherent in such process, method, article, or device. Without further limitation, an element defined by the phrase "including a . . . " does not exclude the presence of additional identical elements in the process, method, article or device including the element.

The above descriptions are only specific embodiments of the present disclosure, so that those skilled in the art can understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments described herein, but is to conform to the widest scope consistent with the principles and novel characteristics disclosed herein.

The invention claimed is:

1. A curtain airbag installing structure, comprising:
    a connecting bolt configured to be connected with a vehicle body, the connecting bolt being provided with an annular limiting groove in a periphery of the connecting bolt;
    a connector configured to be connected with an airbag, wherein the connector is provided with a first insertion hole and a second insertion hole, the first insertion hole is configured to allow an end of the connecting bolt to pass through the connector, the first insertion hole is in communication with the second insertion hole, and the second insertion hole has an opening size smaller than an opening size of the first insertion hole, so that an edge of the second insertion hole is inserted and fitted into the annular limiting groove; and
    an elastic sheet, wherein a first end of the elastic sheet is connected to the connector, a second end of the elastic sheet arranged opposite to the first end of the elastic sheet is configured to abut against the end of the connecting bolt, an elastic tongue configured to limit a radial displacement of the connecting bolt is arranged in a middle of the elastic sheet, and an included angle between the elastic tongue and the second end of the elastic sheet is an acute angle.

2. The curtain airbag installing structure according to claim 1, wherein the connecting bolt comprises a bolt cap and a limiting part, the bolt cap is configured to abut against the second end of the elastic sheet, and the annular limiting groove is formed between the bolt cap and the limiting part.

3. The curtain airbag installing structure according to claim 2, wherein a bent part is arranged in the middle of the elastic sheet, and a maximum distance between the bent part and the connector is less than a sum of sizes of the bolt cap and the annular limiting groove along an axial direction of the connecting bolt.

4. The curtain airbag installing structure according to claim 2, wherein a diameter of the limiting part is larger than the opening size of the first insertion hole.

5. The curtain airbag installing structure according to claim 1, wherein in the connector, at least a surface in contact with the connecting bolt is provided with a plastic coating layer.

6. The curtain airbag installing structure according to claim 1, wherein a plastic coating layer is at least arranged in the annular limiting groove.

7. The curtain airbag installing structure according to claim 1, wherein the connector is provided with an opening configured to be connected with a lug.

8. The curtain airbag installing structure according to claim 1, wherein a guide section is arranged between the first insertion hole and the second insertion hole.

9. The curtain airbag installing structure according to claim 8, wherein two ends of a side wall of the guide section are smoothly connected with side walls defining the first insertion hole and the second insertion hole, respectively.

10. The curtain airbag installing structure according to claim 8, wherein a distance between two opposite guide sections is arranged to gradually decrease from the first insertion hole to the second insertion hole.

11. The curtain airbag installing structure according to claim 1, wherein a free end of the elastic tongue is provided with a bent section configured to abut against the connecting bolt.

12. The curtain airbag installing structure according to claim 11, wherein the bent section is configured to be inserted into a gap between the connecting bolt and the second insertion hole or to abut against an outer peripheral surface of the connecting bolt, after the connecting bolt is inserted into the second insertion hole.

13. The curtain airbag installing structure according to claim 1, wherein the opening size of the first insertion hole is larger than a size of the end of the connecting bolt.

14. The curtain airbag installing structure according to claim 1, wherein the elastic tongue is located between the connector and the middle of the elastic sheet, and a head of the elastic tongue is inclined towards a side where the second end of the elastic sheet is located.

15. A vehicle, comprising a vehicle body, an airbag and a curtain airbag installing structure, wherein the curtain airbag installing structure comprises:
 a connecting bolt connected with the vehicle body, the connecting bolt being provided with an annular limiting groove in a periphery of the connecting bolt;
 a connector connected with the airbag, wherein the connector is provided with a first insertion hole and a second insertion hole, the first insertion hole is configured to allow an end of the connecting bolt to pass through the connector, the first insertion hole is in communication with the second insertion hole, and the second insertion hole has an opening size smaller than an opening size of the first insertion hole, so that an edge of the second insertion hole is inserted and fitted into the annular limiting groove; and
 an elastic sheet, wherein a first end of the elastic sheet is connected to the connector, a second end of the elastic sheet arranged opposite to the first end of the elastic sheet is configured to abut against the end of the connecting bolt, an elastic tongue configured to limit a radial displacement of the connecting bolt is arranged in a middle of the elastic sheet, and an included angle between the elastic tongue and the second end of the elastic sheet is an acute angle.

16. The vehicle according to claim 15, wherein the connecting bolt comprises a bolt cap and a limiting part, the bolt cap is configured to abut against the second end of the elastic sheet, and the annular limiting groove is formed between the bolt cap and the limiting part.

17. The vehicle according to claim 16, wherein a bent part is arranged in the middle of the elastic sheet, and a maximum distance between the bent part and the connector is less than a sum of sizes of the bolt cap and the annular limiting groove along an axial direction of the connecting bolt.

18. The vehicle according to claim 16, wherein a diameter of the limiting part is larger than the opening size of the first insertion hole.

19. The vehicle according to claim 15, wherein in the connector, at least a surface in contact with the connecting bolt is provided with a plastic coating layer.

20. The vehicle according to claim 15, wherein a plastic coating layer is at least arranged in the annular limiting groove.

* * * * *